United States Patent [19]

Fujimoto et al.

[11] 4,125,189
[45] Nov. 14, 1978

[54] TAPE CASSETTE CASE

[75] Inventors: Kazumi Fujimoto, Hino; Toshio Iribe, Tokyo, both of Japan

[73] Assignee: Sony Corporation, Tokyo, Japan

[21] Appl. No.: 810,978

[22] Filed: Jun. 29, 1977

[30] Foreign Application Priority Data

Oct. 22, 1976 [JP] Japan ............................ 59/141177[U]

[51] Int. Cl.² ............................................ B65D 85/67
[52] U.S. Cl. .................................... 206/387; 206/309; 229/9; 229/19
[58] Field of Search ............... 206/387, 309, 312, 313, 206/395; 229/10, 11, 9, 19, 68 R; 220/8

[56] References Cited

U.S. PATENT DOCUMENTS

| | | | |
|---|---|---|---|
| 2,528,830 | 11/1950 | Iliff | 229/11 |
| 3,102,635 | 9/1963 | Werwin et al. | 206/313 |
| 3,746,180 | 7/1973 | Spiroch et al. | 206/387 |

*Primary Examiner*—William T. Dixson, Jr.
*Attorney, Agent, or Firm*—Lewis H. Eslinger; Alvin Dinserbrand

[57] ABSTRACT

A case for storing a tape cassette has inner and outer cases. Peripheral walls join opposite peripheral portions of top and bottom walls of the outer case to define an opening at one side through which the inner case with a cassette therein can be inserted into the outer case. The inner case has a side member which overlies a side of the cassette and is disposed in the opening in the outer case when the inner case with a cassette therein are stored in the outer case. Top and bottom panel members extend at substantial angles from the side member to be disposed against respective top and bottom surfaces of the cassette. At least one of the top and bottom panel members has an edge portion remote from the side member which is angled in respect to a corresponding edge portion of the corresponding one of the top and bottom walls of the outer case extending along the opening into the outer case so that the edge portion of the inner case at least initially passes the corresponding edge portion of the outer case at only one point when the inner case is inserted into the outer case. The inner case is thus more easily inserted into the outer case.

8 Claims, 8 Drawing Figures

TAPE CASSETTE CASE

BACKGROUND OF THE INVENTION

1. Field of the Invention

This invention relates to a case for storing a tape cassette and, more particularly, to a case having an inner case or slip which receives or partly envelopes the cassette and which is slidably inserted with the latter into an outer case.

2. Description of Known Structures

Tape cassettes are usually stored in a case when not in use to protect the cassette from dust and damage. The cassettes are often used frequently, however, so that it is particularly desirable for the cassettes to be easily removed and replaced in their respective cases.

There have been many attempts at providing a case for storing a tape cassette which properly protects the cassette but permits it to be easily removed and replaced. One known cassette case comprises a box-like outer case having an opening for receiving an inner case with the cassette therein. The inner case comprises a cardboard sheet folded in a U-shape to define a side member and opposite top and bottom panel members which are disposed against corresponding side, top and bottom surfaces of the cassette. The side member of the inner case is disposed in the opening into the outer case when the cassette and inner case are stored therein to cover at least the portion of the cassette which would otherwise be exposed by the opening.

In order to remove the inner case and cassette from the outer case, edges of the top and bottom walls of the outer case along the opening have thumb-size arcuate cutouts. The corresponding exposed portions of the top and bottom panel members of the stored inner case can then be gripped to pull the cassette and inner case from the outer case. Inasmuch as the inner case only extends in its U-shape along three sides of the cassette, however, and because the exposed portions of the inner case are only thumb-sized, the frictional engagement between the inner case and the cassette is often insufficient to withdraw the cassette from the outer case with the inner case. As a result, the inner case may be pulled from the outer case, while the cassette itself remains in the outer case. A second attempt to remove the cassette from the outer case is then required and, sometimes, the outer case had to be shaken or stretched in order to dislodge the cassette.

It has therefore been proposed to configure a substantial portion of the opposite edges of the outer case along the opening concavely of the outer case, preferably in a chevron. The concave chevron exposes a substantial portion of the inner case so that the inner case can be more firmly gripped for more assuredly removing the cassette from the outer case with the inner case.

When it is desired to replace the cassette in the case, the cassette is placed in the inner case and the inner case and cassette are then slid into the outer case through the opening. Free edges of the top and bottom panel members of the inner case remote from the side member thus have to slip past the corresponding edges of the outer case along the opening. If the free edges of the top and bottom panel members of the inner case are parallel to the corresponding edges of the outer case, then, as the cassette and inner case are being slidably inserted, the edges have to pass each other all along their lengths at once. In such case, the edges can easily catch on each other to prevent the easy insertion of the inner case and cassette into the outer case, particularly if one of the panel members does not lie flush with the adjacent surface of the cassette.

It has been proposed to avoid this problem by forming the panel members of the inner case with V-shaped free edges. However, such V-shaped free edges and the thumb-sized arcuate cutouts in the edges of the outer case along the opening are symmetrically arranged, so that the apex of each V-shaped edge is aligned with a respective arcuate cutout. Symmetrically opposite edge portions of the V-shaped edge of a panel member then have to simultaneously pass opposite portions of the respective arcuate cutout. Although the V-shaped panel member edge is no longer engageable with the corresponding edge of the outer case along a line, each V-shaped edge still has to simultaneously pass two points on the edge of the outer case. Thus, the inner case and cassette are still relatively difficult to insert in the outer case. Moreover, the corners where the arcuate indentation or cutout joins the remaining edge portion of the outer case along the opening often became damaged or burred by repeated engagements with the edge of the panel members to further impede smooth insertion of the inner case and cassette into the outer case.

In the existing cases in which edge portions of the outer case are chevron-shaped, the panel members of the inner case have straight free edges. Thus, the straight edges on the panel members still simultaneously pass the chevron-shaped edges of the outer case at two symmetrically opposite points when the inner case is inserted into the outer case. Although this arrangement is an improvement over the thumb-sized indentations or cutouts for removing the cassette and inner case from the outer case, it does not facilitate insertion of the inner case and cassette into the outer case.

SUMMARY OF THE INVENTION

Accordingly, it is an object of the invention to provide a case for storing a tape cassette having an inner case which receives the cassette and can be more easily inserted through an opening into an outer case for storing the cassette.

In accordance with an aspect of this invention, a case for storing a tape cassette comprises an inner case receiving the cassette and an outer case having an opening through which the inner case with the cassette therein can be inserted into the outer case. The inner case has a side member which overlies a side of the cassette and is disposed in the opening of the outer case when the inner case with a cassette therein are stored in the outer case, and top and bottom panel members extend at substantial angles from the side member to be disposed against respective top and bottom surfaces of the cassette.

The top and bottom panel members of the inner case have edge portions remote from the side member and the top and bottom walls of the outer case have edge portions extending along the opening into the outer case. The edge portion of at least one of the top and bottom panel members is angled in respect to the corresponding edge portion of the corresponding one of the top and bottom walls when the inner case is positioned to be inserted into the outer case through the opening so that the edge portion of the inner case at least initially passes the corresponding edge portion of the outer case at only one point. By having the edge of the inner case angled in this way, the inner case is easier to insert into the outer case.

When the cassette is stored within the inner and outer cases, the side member of the inner case which is then disposed in the opening into the outer case preferably protects the portion of the cassette along the opening by being dimensioned to close the opening. The top and bottom panel members of the inner case extend into the outer case to hold the inner case in its cassette-protecting position. In order to make the cassette and inner case easy to remove from the outer case, the edge portions of the outer case along the opening are preferably substantially concave in a generally chevron-shape. The top and bottom panel members of the inner case then also protect portions of the cassette adjacent the concave edges of the outer case.

BRIEF DESCRIPTION OF THE DRAWINGS

Preferred embodiments of the invention which are intended to illustrate and not to limit the invention will now be described with reference to the accompanying drawings in which.

DESCRIPTION OF THE PREFERRED EMBODIMENTS

Figure 1:
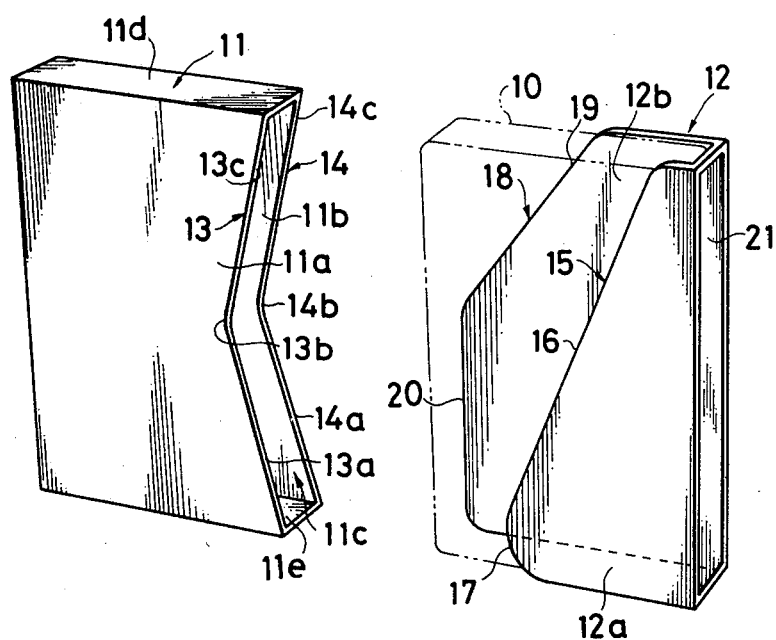
FIG. 1 is a perspective view of an embodiment of a tape cassette case according to the present invention with the parts of such case being shown apart from each other.

Referring initially to FIG. 1, it will be seen that a case according to this invention for storing a tape cassette 10 comprises a box-like outer case 11 and an inner case 12 of generally U-shaped cross section. The cassette 10 is shown on FIG. 1 in the position in which it is received in the inner case 12, and the cassette and inner case are there shown positioned preparatory to being slidably inserted into the outer case 11 for storing the cassette.

Both the inner and outer cases can be erected from sheet material such as thick paper, cardboard or synthetic resin sheets. If the case members are made from paper or cardboard, the paper or cardboard may also be coated with a synthetic resin.

The box-shaped outer case 11 is closed on all but one side for securely storing and protecting the cassette. Opposite portions of the peripheries of top and bottom walls 11a, 11b of the outer case join peripheral walls 11d, 11e to define an opening 11c into the outer case. Edge portions 13, 14 of the top and bottom walls extend along the opening. Each of the edge portions 13, 14 is concave inwardly of the outer case in a chevron shape to define oppositely angled segments 13a, 14a; 13c, 14c joined, respectively, at an apex 13b, 14b. The apices 13b, 14b may be rounded as shown in FIG. 1.

Particularly when the apices of the chevron shaped edges are rounded, the chevron shape approximates several other curves such as an hyperbola. Such other shapes are inclined within the definition of chevron-shaped as used herein.

The generally U-shaped cross section of inner case 12 is defined by top and bottom panel members 12a, 12b extending from a side member 21 which forms a bridge or base of the U-shaped cross section. The top, bottom and side members of the inner case overlie corresponding surfaces of the cassette 10 so that, as later described, the cassette and inner case can be slidably inserted through the opening 11c into the outer case for storing the cassette.

Figure 5:
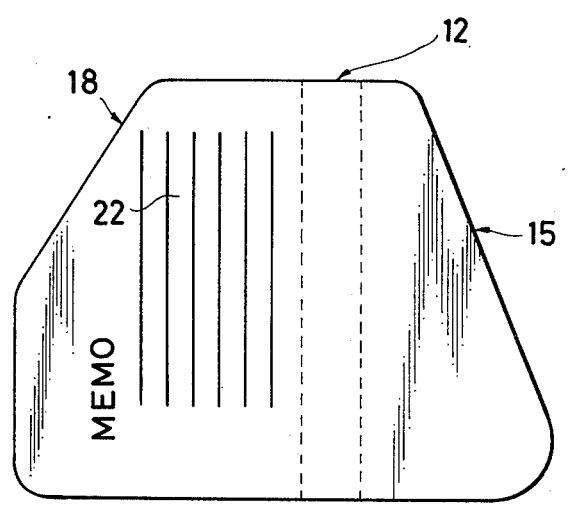
FIG. 5 is a developmental view of the inner case of the embodiment shown in FIG. 1.

The top panel member 12a of the inner case has a free edge portion 15 remote from the side member 21. The free edge portion 15 is shown to comprise a substantially linear segment 16 which extends from one end of the edge portion to an arcuate segment 17 at the other end. The linear segment 16 is inclined away from the side member 21 in the direction toward the arcuate segment 17. The bottom member 12b also has a free edge portion 18 remote from the side member 21. The free edge portion 18, however, comprises an inclined segment 19 and a segment 20 which is generally parallel to the side member 21. As shown in FIG. 1, the bottom panel member 12b is also wider than the top panel member 12a. The combination of the edge segment 20 extending parallel to the side member 21 and the greater width of the bottom panel member 12b provide a substantial surface area 22 (FIG. 5) on the bottom panel member to provide space for writing information on, for example, the content of the tape on the inner case.

In describing the inner and outer cases, top and bottom portions have been described. Needless to say, the top and bottom portions are interchangeable.

The operation of the inner and outer cases for storing a cassette can now be described with reference to FIGS. 2 to 4. The cassette 10 is not shown in FIGS. 2 to 4, it being understood, however, that the cassette is received in the inner case as shown in FIG. 1.

Figure 2:
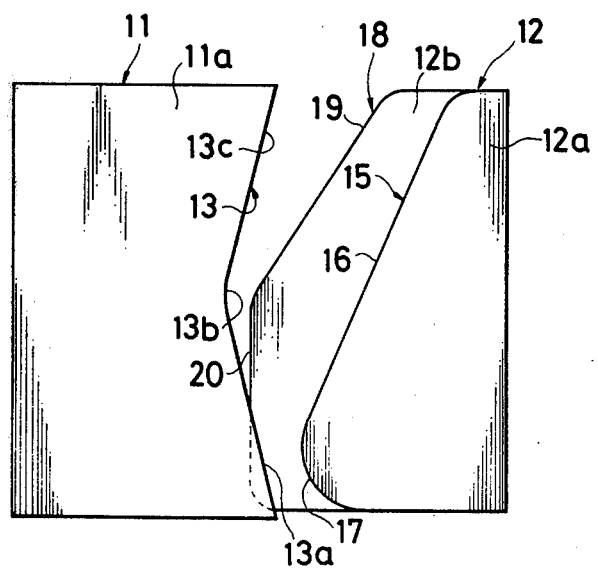
FIG. 2 is a plan view of the embodiment shown in FIG. 1 with inner and outer cases thereof being shown in an initial position at the commencement of the insertion of the inner case into the outer case.

When the inner case is slidably inserted into the outer case for storing the cassette, the wider dimension of the bottom panel member 12b of the inner case causes the bottom panel member to first enter the outer case as shown on FIG. 2. As this occurs, the combination of the segment 20 of the edge portion of the bottom panel member of the inner case and the concave segment 14a (shown only in FIG. 1, but corresponding to the segment 13a shown in FIG. 2) of the bottom wall of the outer case causes the edge portion 20 of the bottom panel member 12b to pass the corresponding portion 14a of the bottom wall at only one point.

FIG. 2 also shows that the junction of the edge portions 19 and 20 of the bottom panel member of the inner case is aligned with the apex 14b (shown only in FIG. 1, but corresponding to the apex 13b shown in FIG. 2). The angle of the edge portion 19 is larger than the corresponding angle of the chevron-shaped edge portion 14c along the opening into the outer case so that the edge portions 14c, 19 continue to pass each other at a single point as the inner case is further slidably inserted into the outer case.

Figure 3:
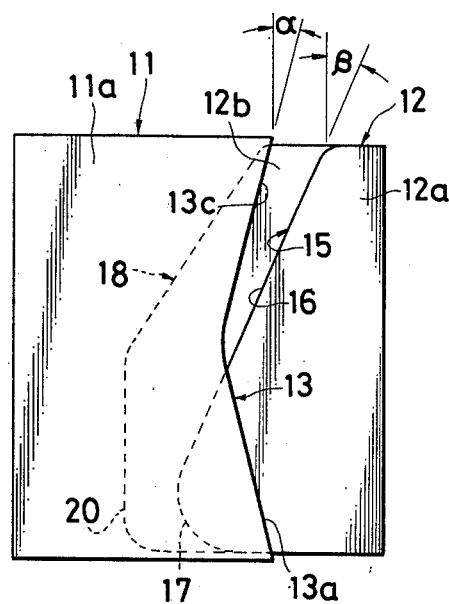
FIG. 3 is a view similar to that of FIG. 2, but with the inner and outer cases shown in an intermediate position relative to each other.

Referring now to FIG. 3, it will be appreciated that as the inner case is still further slidably inserted into the outer case, the edge portion 15 of the narrower top panel member 12a of the inner case passes the corresponding edge portion 13 of the top wall of the outer case. The linear and arcuate segments 16, 17 of the free edge portion of the inner case are also arranged in combination with the corresponding edge portion 13 of the outer case so that, initially, the free edge portion of the inner case passes the edge portion of the outer case at only one point.

For a brief time thereafter, however, the arcuate segment 17 of the edge portion of the top panel member passes the edge portion of the top wall member of the outer case at two points. Inasmuch as the arcuate portion is positioned at an end of the edge, however, further sliding movement of the inner case into the outer case quickly returns the edge of the outer case to the condition shown in FIG. 3 in which the edges pass each other at only one point.

In order to assure that the edge portion 15 of the inner case will continue to pass the edge portion 13c of the outer case at only one point after the edge passes the apex 13b of the chevron-shaped concavity with further sliding movement of the inner case into the outer case, the angle of the linear edge segment 16 is made greater than the corresponding angle of the edge portion 13c. The angle "$\beta$" of the linear segment 16 of the top panel member in respect to a vertical base line is thus indicated in FIG. 3 to be larger than the corresponding angle "$\alpha$" of the segment 13c to a parallel vertical base line. With the exception of the brief time during which the arcuate portion 17 of the free edge of the top panel member of the inner case passes the corresponding edge of the outer case at two points, therefore, the edges of the inner and outer cases are arranged to pass each other at only one point as the inner case is slidably inserted to its fully stored position shown in FIG. 4.

Figure 4:
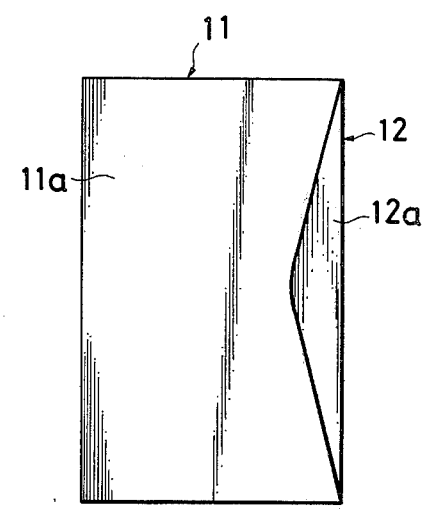
FIG. 4 is another view similar to that of FIG. 2, but with the inner fully inserted in the outer case for storing a cassette therein.

As shown in FIG. 4, the side member (21 in FIG. 1) of the inner case 12 is disposed in the opening to the outer case 11 when the cassette is stored. The side member 21 is also dimensioned to close the opening to protect the underlying side of the cassette. Portions of the cassette adjacent the concave edges of the outer case are protected by the overlying portions of the top and bottom panel members of the inner case which are exposed by the concavity in the edges of the outer case. The remainder of the cassette is enclosed within the outer case to be protected by the outer case.

The concave edges 13 and 14 of the outer case extend all along the opening to provide substantial access to the corresponding portions of the panels 12a and 12b of the inner case 12. The inner case 12 thus can be firmly gripped for withdrawing the inner case and cassette, as a unit, from the outer case. The risk of pulling only the inner case from the outer case is therefore reduced.

By having each of the free edge portions 15 and 18 of the inner case pass the corresponding edge portions 13 and 14 of the outer case at only one point, there is only one point along each of the edges which could catch on the corresponding edge of the outer case as the inner and outer cases are slidably inserted together. Having only one point which could catch both reduces the actual number of catchable locations and makes it easier to monitor these locations as the cassette is being stored to still further reduce the possibility of having an edge of the inner case catch on an edge of the outer case. The cassette is thus easier to store than with other case structures in which more points or even lines of engagement between the inner and outer cases are possible. In addition, by reducing the possibility of having the inner case catch on the outer case, the edges of the inner and outer cases will not become burred as quickly with repeated storage operations. The disclosed case thus retains its easier storage function more readily than cases which are more likely to catch and burr to make subsequent storage operations even more difficult.

Figure 6:
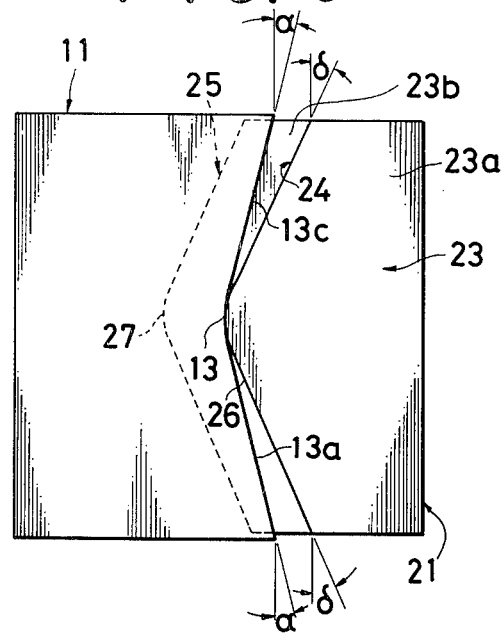
FIG. 6 is a plan view of another embodiment of a tape cassette case according to the present invention.

FIG. 6 shows another embodiment of the invention which operates in the same way as the embodiment just described, but with two points at which the free edge portions of the inner case pass the corresponding edge portions of the outer case after initially passing the edges of the outer case at only one point. Inasmuch as the embodiment shown in FIG. 6 is substantially similar to the embodiment shown in FIGS. 1 to 5, similar portions are identified with the same reference characters and only the differences need be described.

In the embodiment shown in FIG. 6, the inner case 23 has its top and bottom panel members 23a, 23b formed with free edge portion 24 and 25, respectively, remote from the side member 21 of the inner case, and which are chevron-shaped and formed with a rounded apex directed away from the side member 21, as at 27. Each segment of the chevron-shaped free edge portions, for example, segment 26 of edge portion 24, forms an angle "$\delta$" to a vertical base line which is larger by, for example, 3° than the angle "$\alpha$" to a parallel base line formed by the segments of the chevron-shaped concave edges 13 and 14 along the opening of the outer case 11. By having the angles of the segments of the edge portions 24 and 25 on the top and bottom panel members of the inner case larger than the angles of the corresponding edge portions along the opening to the outer case, the edge portions of the top and bottom panel members initially pass the corresponding edge portions of the outer case at only one point, and thereafter at only two points.

Figure 7:
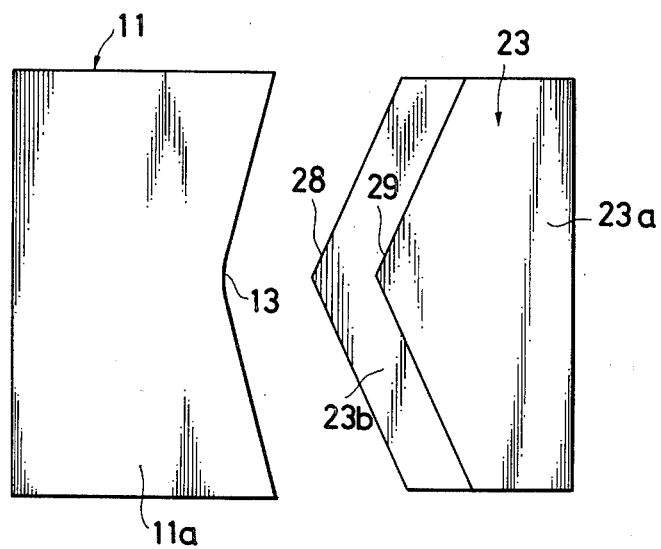
FIG. 7 is a plan view of still another embodiment of a tape cassette case according to the present invention which is generally similar to that shown in FIG. 6, but which is shown with its inner and outer cases apart from each other.

FIG. 7 shows another embodiment of the invention which differs from the embodiment shown in FIG. 6 only in that the apices of the chevron-shaped free edge portions 28 and 29 on the top and bottom panel members 23a and 23b of the inner case 23 are angular instead of arcuate.

Figure 8:
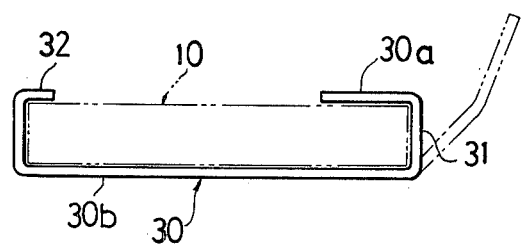
FIG. 8 is an end view of still another embodiment of an inner case member forming a part of a tape cassette case according to the present invention.

FIG. 8 shows an end view of still another inner case 30. The right portion of FIG. 8 also shows in phantom a portion of the inner case 30 which has not yet been erected or folded about the tape cassette 10.

The inner case 30 is shown to have top and bottom panel members 30a and 30b extending from a side member 31. However, in this embodiment, one of the top and bottom panel members, for example, the bottom panel member 30b, extends around a side of the cassette 10 opposite the side which the side member 31 overlies and has a reverted extension or portion 32 disposed against the same side of the cassette as the top panel member 30a. The inner case 30 is thus wrapped around the cassette, instead of only overlying three sides of the cassette as with the previously described embodiment.

Extending the inner case 30 around the cassette 10 helps to hold the cassette in the inner case when the inner case and cassette are pulled from the outer case. This configuration of the inner case 30 thus cooperates with the substantial, chevron-shaped concavity along the opening to the outer case 11 to make the cassette easier to remove from the case. The substantial concavities in the edge portions 13 and 14 of the outer case expose corresponding substantial portions of the top and bottom panel members 30a and 30b of the inner case so that the inner case can be firmly grasped. The resulting increased frictional engagement between the overlying top and bottom panel members and the cassette improves the ability to pull the cassette from the outer case with the inner case as compared to known structures in which the opening to the outer case had only thumb-sized indentations or cutouts.

With the embodiment shown in FIG. 8, the top and bottom panel members 30a and 30b which extend inwardly of the plane of the Figure are obviously interchangeable. The free edge portion (not shown) of the top panel member 30a may have a configuration similar to any one of the previously described edge portions 15, 24 and 29 so that the edge portions of the inner and outer case will at least initially pass each other at only one point when the inner case is slidably inserted into the outer case. For example, the free edge of panel member 30a may be shaped like the edge 15 on FIG. 1, while the free edge of the reverted extension 32 of panel member 30b may be shaped like the edge 18 on FIG. 1. The embodiment shown in FIG. 8 thus has the same advantages as the earlier described embodiments with the additional advantage of more firmly holding the cassette.

Returning briefly to FIG. 1, it will be seen that the arcuate edge portion 17 of edge 15 has tangential angles associated with successive points along the arc. One of these tangential angles may be the same as the angle $\alpha$ (FIG. 3) of the corresponding edge 13a of the outer case 11. Mathematically, the tangential angle is the angle of only a point and does not define a dimension of an edge. Technically, therefore, defining the edge portions 15 and 18 of the inner case 12 as being angled in respect to the corresponding edge portions 13 and 14 of the outer case so as to pass each of the edge portions of the outer case initially at one point is accurate. Practically, of course, the arcuate segment 17 has an edge segment with tangential angles so close to the angle of the corresponding portion of the edge of the outer case that this segment passes the edge portion of the outer case all at once along the segment rather than at one point precisely. In addition, the arcuate portion 17 could be a segmented curve with one segment parallel to the corresponding portion of the edge of the outer case. As used herein, therefore, the definition of an edge portion on the inner case which is angled in respect to the corresponding edge portion along the opening to the outer case to pass at one point includes short segments on the edge portion of the inner case, such as a segment of the arcuate segment 17, which may be substantially parallel to the corresponding edge portion on the outer case to pass initially along a correspondingly short line.

Although illustrative embodiments of the invention have been described in detail herein with reference to the accompanying drawings, it is to be understood that the invention is not limited to these precise embodiments, an that various changes and modifications may be effected therein by one skilled in the art without departing from the scope or spirit of the invention as defined in the appended claims.

What is claimed is:

1. A case for storing a tape cassette comprising: an inner case for receiving a cassette; an outer case having top and bottom walls and a peripheral wall joining opposite portions of the peripheries of said top and bottom walls for defining an opening at one side of said outer case through which said inner case with a cassette received therein can be slidably inserted into and removed from said outer case in a direction parallel to the planes of said top and bottom walls; said inner case having a side member disposed in said opening of said outer case when said inner case with a cassette received therein is stored in said outer case, said inner case further having top and bottom panel members extending to different lengths from said side member to be disposed against respective top and bottom surfaces of a cassette when the latter is received in said inner case with said side member overlying a side of the cassette, said top wall and said top panel member having edge portions remote from said peripheral wall and side member, respectively, which are angled in respect to each other, and said bottom wall and said bottom panel member having edge portions remote from said peripheral wall and said side member, respectively, which are angled in respect to each other, an edge portion of at least one of said panel members forming an angle with respect to a base line which is greater than the angle formed between said base line and a corresponding edge portion of said outer case so that an edge portion of said inner case at least initially passes a corresponding edge portion of said outer case at only one point as said inner case with a cassette therein is slidably inserted through said opening of said outer case for storing of the cassette, whereby said inner case with a cassette received therein is more easily insertable into said outer case.

2. A case according to claim 1; wherein at least one of said top and bottom walls of said outer case has a substantially concave edge along said opening to expose a corresponding substantial portion of the corresponding one of said top and bottom panel members for making said substantial exposed portion of a panel member of said inner case accessible for removing said inner case with a cassette received therein from said outer case.

3. A case according to claim 2; wherein said top and bottom walls of the outer case have substantially chevron-shaped edges extending along the entire length of said opening.

4. A tape cassette according to claim 1; wherein the edge portion of at least one of said top and bottom panel members of said inner case extends substantially linearly from one end thereof to an arcuate segment at the other end thereof.

5. A case according to claim 1; wherein the edge of at least one of said top and bottom panel members of said inner case extends away from said side member in a chevron-shape with a rounded apex.

6. A case according to claim 3; wherein the edge of at least one of said top and bottom panel members of said inner case extends away from said side member in a chevron-shape with an angular apex.

7. A case according to claim 1; wherein one of said top and bottom panel members of said inner case extends around a side of said cassette opposite said side which said side member of said inner case overlies and has a portion disposed against the same side of said cassette as the other of said top and bottom panel members of said inner case.

8. A case for storing a tape cassette, comprising: an inner case for receiving a cassette; an outer case having top and bottom walls and peripheral walls joining opposite portions of the peripheries of said top and bottom walls for defining an opening at one side of said outer case through which said inner case with a cassette received therein can be inserted into said outer case, said top and bottom walls having chevron-shaped concave edge portions extending along the entire length of said opening; said inner case having a side member disposed in said opening of said outer case when said inner case with a cassette received therein is stored in said outer case, said inner case further having top and bottom panel members extending from said side member to be disposed against respective top and bottom surfaces of a cassette when the latter is received in said inner case with said side member overlying a side of the cassette, at least one of said top and bottom panel members having an edge portion remote from said side member which is angled away from said side member along a substantially linear segment extending from one end of said edge portion to an arcuate segment at the other end thereof in respect to said edge portion of the corresponding one of said top and bottom walls of said outer case extending along said opening when said inner case is positioned to be inserted into said outer case through said opening thereof so that said angled edge portion of said inner case at least initially passes said corresponding edge portion of said outer case at only one point as said inner case with a cassette therein is slidably inserted through said opening of said outer case for storing of the cassette, whereby said inner case with a cassette received therein is more easily insertable into said outer case.

* * * * *